United States Patent [19]
Pierce

[11] Patent Number: 5,928,332
[45] Date of Patent: Jul. 27, 1999

[54] COMMUNICATION NETWORK WITH REVERSIBLE SOURCE ROUTING THAT INCLUDES REDUCED HEADER INFORMATION BEING CALCULATED IN ACCORDANCE WITH AN EQUATION

[75] Inventor: Paul R. Pierce, Portland, Oreg.

[73] Assignee: Intel Corporation, Santa Clara, Calif.

[21] Appl. No.: 08/761,415

[22] Filed: Dec. 6, 1996

[51] Int. Cl.[6] .................................................. G06F 13/00
[52] U.S. Cl. .......................................... 709/242; 709/238
[58] Field of Search ................................... 370/221, 389; 709/242, 238

[56] References Cited

U.S. PATENT DOCUMENTS

| | | | |
|---|---|---|---|
| 4,742,511 | 5/1988 | Johnson | 370/94 |
| 4,875,208 | 10/1989 | Furuhashi | 370/94.1 |
| 5,095,480 | 3/1992 | Fenner | 370/94.1 |
| 5,465,251 | 11/1995 | Judd et al. | 370/54 |
| 5,581,543 | 12/1996 | Natarajan | 370/221 |
| 5,781,546 | 7/1998 | Sethu | 370/389 |

*Primary Examiner*—Le Hien Luu
*Attorney, Agent, or Firm*—Kenyon & Kenyon

[57] ABSTRACT

A source routing communication network of arbitrary topology communicates a message that includes header information. The communication network includes a plurality of routers, each router including a plurality of input/output ports and adapted to receive and send messages. Each router determines which output port of the router to send a router received message based on a portion of the header information. The communication network also includes a plurality of nodes adapted to receive and send messages. Each node is coupled to one of the routers, and modifies the header information of a node received message so that the header information provides a return route to the source node of the node received message.

16 Claims, 4 Drawing Sheets

COMMUNICATION NETWORK WITH REVERSIBLE SOURCE ROUTING THAT INCLUDES REDUCED HEADER INFORMATION BEING CALCULATED IN ACCORDANCE WITH AN EQUATION

BACKGROUND OF THE INVENTION

The present invention is directed to a communication network. More particularly, the present invention is directed to a source routing communication network of arbitrary topology that includes reduced header information.

Many types of digital communication networks exist that provide paths between nodes to communicate data or "messages." Some networks, generally referred to as circuit switched networks, provide a single, direct, point-to-point path between nodes. Other networks, generally referred to as packet-switched networks, provide multiple potential paths between nodes, and the route taken may vary frequently. Some packet-switched networks include routers between nodes. The routers, which typically include multiple input/output ports, receive incoming data on an input port and send the data on a selected output port.

FIG. 1 illustrates an embodiment of a packet-switched communication network 8 that includes routers 10–13 and nodes 31–38. Nodes 31–38 represent various hardware entities. For example, if communication network 8 represents a remote network, such as the Internet, each node 31–38 may be a computer server. If communication network 8 represents a multiprocessor computer system, each node 31–38 may be a processor, a peripheral device such as random access memory, or a disk drive. Nodes 31–38 are the source and destination of messages on communication network 8.

Each router 10–13 in communication network 8 includes a plurality of communication input/output ports which are coupled to communication paths. Routers 10–13 are coupled to each other via communication paths 20–25. For example, router 10 is coupled to router 11 via path 21 and to router 12 via path 22.

Each router 10–13 is coupled to at least one node 31–38 via communication paths 40–47, respectively. For example, node 34 is coupled to router 12 via communication path 43, and node 32 is coupled to router 13 via communication path 41.

Communication network 8 provides multiple routes between nodes 31–38. If, for example, node 31 must send a message to node 35, the message can travel along path 40, through router 13, along path 23, through router 11, along path 44 to node 35. In an alternative route, the message can travel along path 40, through router 13, along path 24, through router 12, along path 25, through router 11, along path 44 to node 35.

Communication network 8 has an arbitrary topology because the number and position of routers and nodes is not fixed.

Various routing schemes exist for routing a message from one node to another node in communication network 8. One such scheme is known as source routing. With source routing, the source node selects the route that the message travels to reach the destination node. The selected route is included in a header that is appended to the message. When the message arrives at a router, that router will select an output port for the message based on the header information.

Some messages sent on communication network 8 require a reply to the source node. For example, a source node might require an acknowledgment from the destination node that the message was received. In most known source routing schemes, the part of the header that specifies the route from the source node to the destination node is lost when the message arrives at the destination node. For example, with hop-count based mesh routing, the route is decremented at each hop so that it contains no information by the time it reaches the destination. With Myrinet routing, the route is stripped off entirely. Therefore, in these known source routing schemes, when a reply message is required, both the source node to destination node route and the source node address must be included in the header so that the destination node can determine the return route. Thus, the header includes redundant routing information. However, to support very small messages efficiently, it is desirable to limit the amount of information in the message header.

Hypercube routing is a known source routing scheme that allows the return route to be constructed from the source node to destination node route. However, the Hypercube routing scheme is limited to communication networks that implement a hypercube topology, which requires $2_n$ nodes, where n>0 and is an integer. This specific non-arbitrary topology limits the flexibility of the design of a communication network.

Based on the above, there is a need for a source routing communication network of arbitrary topology that utilizes a small message header which includes the source node to destination node route, and that allows a return route from the destination node to be constructed from the header.

SUMMARY OF THE INVENTION

These and other needs are satisfied by the present invention. One embodiment of the present invention is a source routing communication network of arbitrary topology for communicating a message that includes header information. The communication network includes a plurality of routers, each router including a plurality of input/output ports and adapted to receive and send messages. Each router determines which output port of the router to send a router received message based on a portion of the header information. The communication network also includes a plurality of nodes adapted to receive and send messages. Each node is coupled to one of the routers, and modifies the header information of a node received message so that the header information provides a return route to the source node of the node received message.

DETAILED DESCRIPTION

Figure 1:
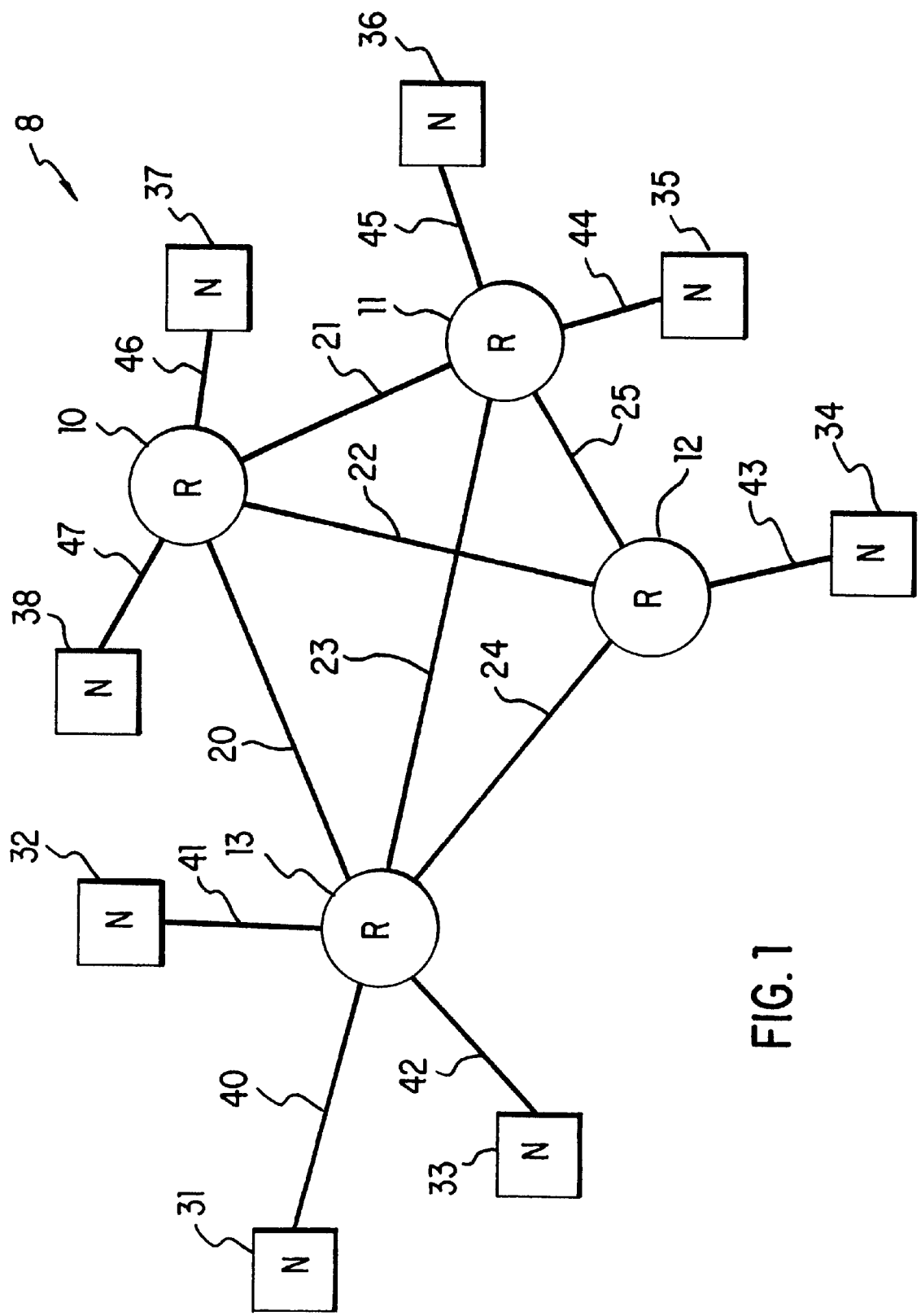
FIG. 1 is a schematic diagram illustrating an embodiment of a packet-switched communication network that includes routers and nodes.
Figure 2:
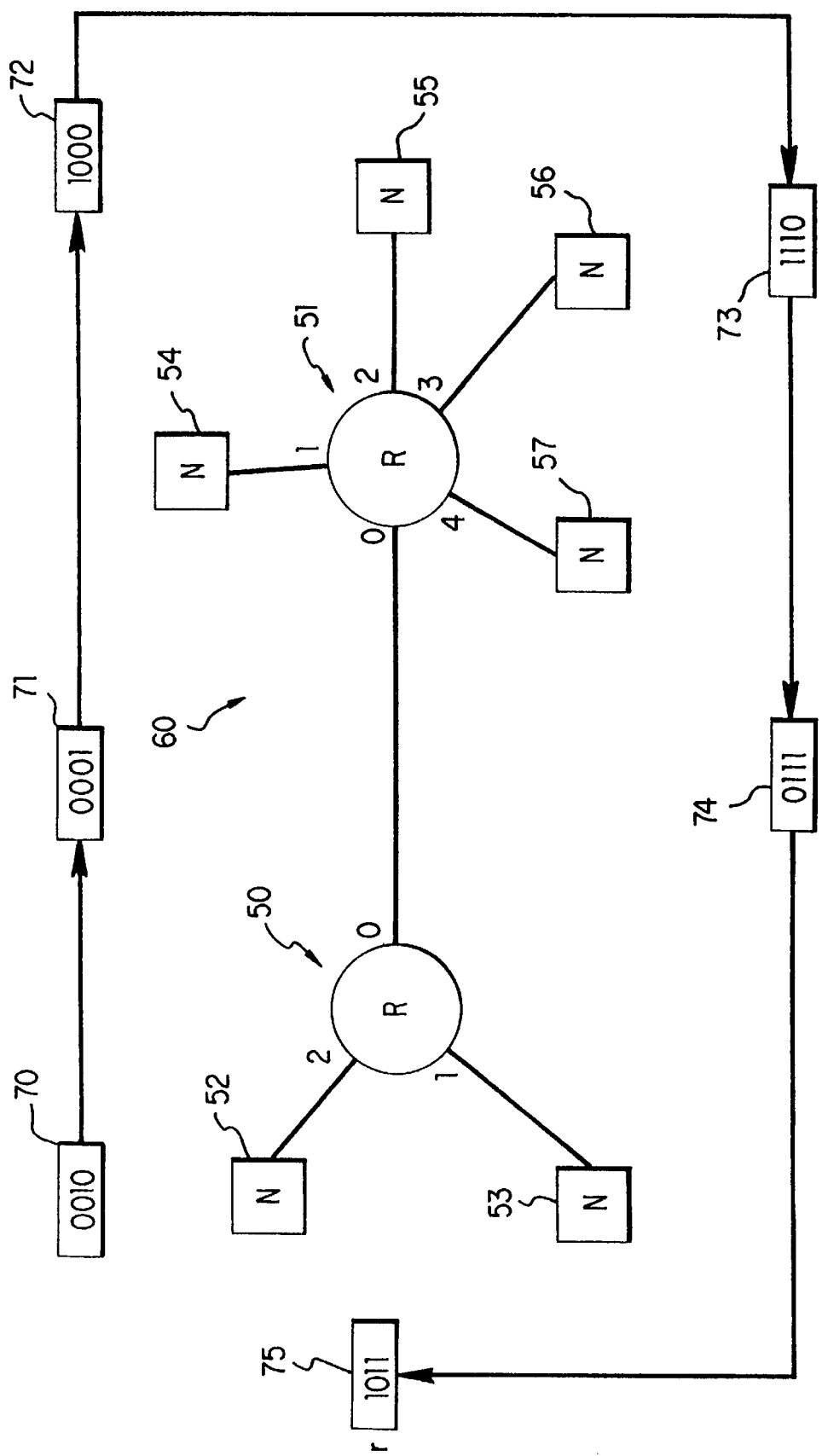
FIG. 2 is a schematic diagram illustrating an embodiment of a packet-switched communication network that includes routers and nodes in accordance with the present invention.

FIG. 2 illustrates an embodiment of a communication network in accordance with the present invention. Communication network 60, like communication network 8 in FIG. 1, is packet-switched, includes routers and nodes, and is of arbitrary topology. Routers 50, 51 include multiple input/output ports that are numbered consecutively in the clockwise direction starting with 0. Routers 50, 51 include $2^n+1$ ports, where n>0 and is an integer. Therefore, routers 50, 51 include 3, 5, 9, 17, etc. number of ports. In another embodiment, routers 50, 51 further include a processor and a storage device.

Coupled to the routers 50, 51 via communication paths and the input/output ports are nodes 52–57. The nodes 52–57 are the source and destination of messages sent on the communication network 60. In another embodiment, nodes 52–57 further include a processor and a storage device.

The communication network 60 is illustrated with two routers and six nodes. However, an embodiment of the communication network in accordance with the present invention can include any number of routers and nodes. Further, communication network 60 includes separate nodes and routers. However, in another embodiment, each router and its associated nodes is a single integrated device.

The communication network 60 is a source routing network. Therefore, a message sent from one node 52–57 to another includes a header, or route field "r" appended to it. The route field r designates the route to be taken from the source node to the destination node. As will be described, the route field r, after processing by the destination node, also designates the route to be taken by a return message from the destination node to the source node.

The route field r differs for every route on the communication network 60. The route field r for each route is made available to nodes 52–57. In one embodiment a lookup table listing each possible route and its corresponding route field r is used when sending a message. For example, if a message is being sent from node 53 to node 54, the lookup table provides the route field r for that route. The provided route field r is appended to the message as header information. The lookup table can be assembled in a known manner by systematically probing all available routes on the communication network 60. The probing is done by sending out messages with differing header information, and using the return information to determine, for each header information, which node received the message. The assembled lookup table is available to nodes 52–57.

Figure 3:
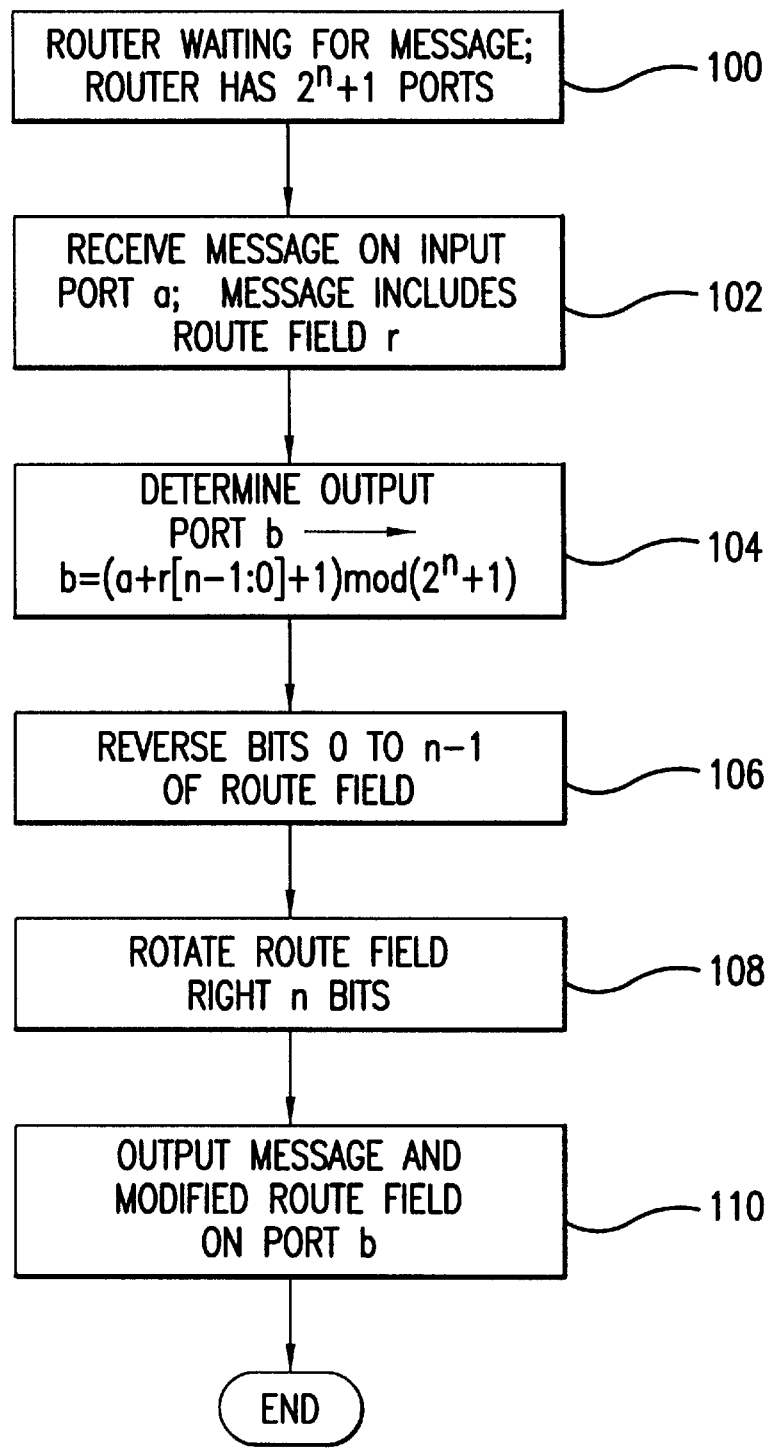
FIG. 3 is a flowchart of the steps performed by an embodiment of a router in accordance with the present invention in response to receiving a message via an input port.

FIG. 3 is a flowchart illustrating the steps performed by each router 50, 51 in response to receiving a message via an input port. In one embodiment, the steps are executed in hardware via the router. In another embodiment, the steps are executed in software via the router's processor, and stored in the router's storage device.

At step 100, the router, which includes $2^n+1$ ports, is waiting for a message.

At step 102, a message is received on an input port "a" where "a" is the port number of the router. The message has a binary route field r appended to it.

At step 104, the router determines output port "b" on which the message will be sent where "b" is the port number of the router. Output port b is determined using the following equation (the "router equation"):

$$b=(a+r[n-1:0]+1) \bmod (2^n+1)$$

(note: r[n−1:0] is the value of bits 0 to n−1 of the routing field r, and the least significant bit of the routing field r is bit 0).

Through the use of the router equation, the router uses n bits of the route field r to determine the output port b. In an alternative to the router equation, the output port b can also be determined by the router by having the router count from the port that the message is received. The port through which the message will be sent is at least one step clockwise from the one it arrived on, plus the value of the portion of the routing field (n bits) used by the router.

At step 106, the router modifies the route field r by reversing bits 0 to n−1. At step 108, the router further modifies the route field r by rotating the route field r right n bits.

At step 110, the router sends the message, and the modified route field r appended to it, via output port b.

Figure 4:
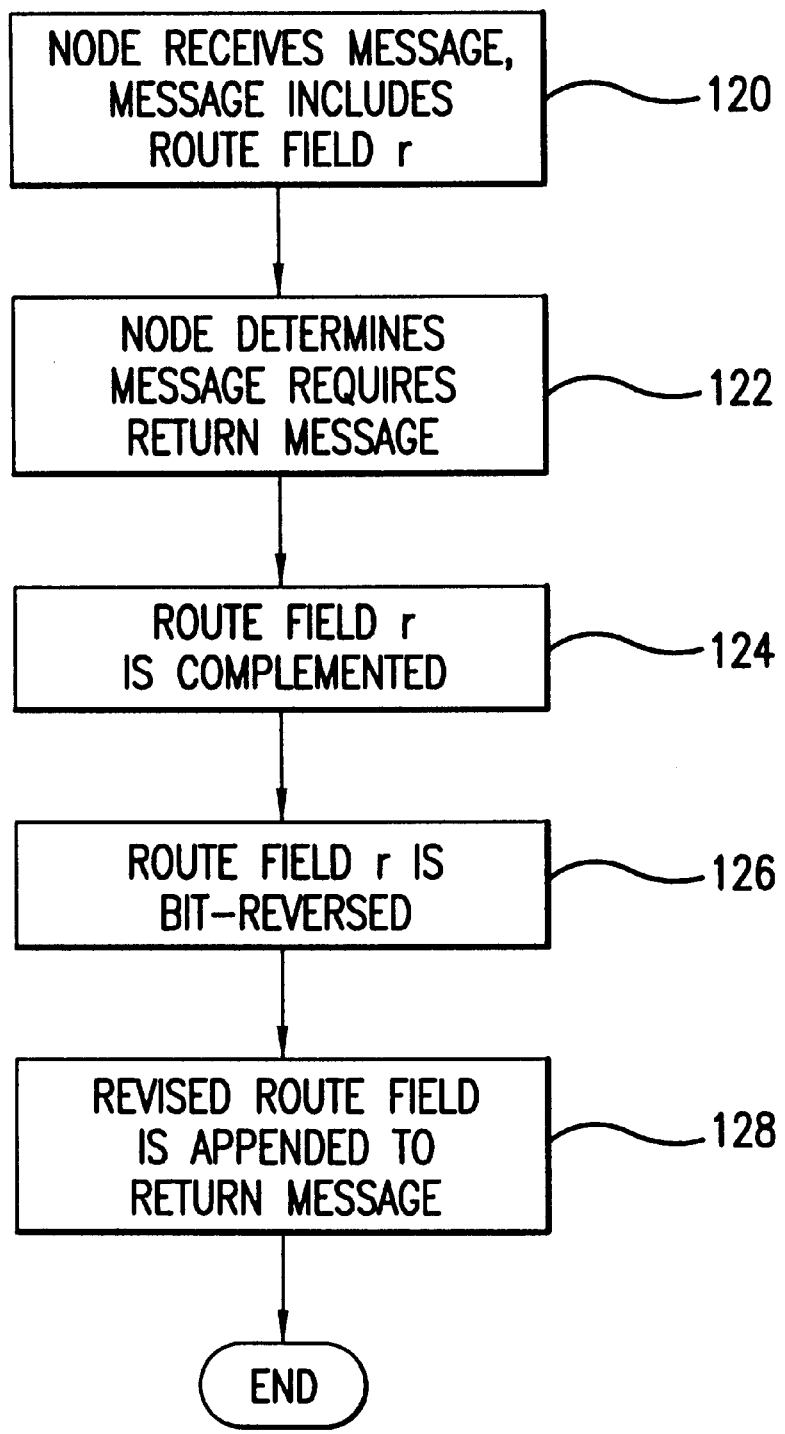
FIG. 4 is a flowchart of the steps performed by an embodiment of a node in accordance with the present invention in response to receiving a message.

FIG. 4 is a flowchart illustrating the steps performed by each node 52–57 in response to receiving a message. In one embodiment, the steps are executed in hardware via the node. In another embodiment, the steps are executed in software via the node's processor, and stored in the node's storage device.

At step 120, the node receives a message via a communication path. The message includes a binary route field r appended to it.

At step 122, the node determines that the message requires a return message.

After step 122, the node modifies route field r in steps 124 and 126.

At step 124, the route field r is complemented.

At step 126, the route field r is bit-reversed.

At step 128, the modified route field r is appended to the return message. The return message now contains the routing information it needs to return to the source node.

An example will illustrate how the steps performed by the routers 50, 51 and the nodes 52–57 enable a single route field r to designate both the route from a source node to a destination node and the return route from the destination node to the source node. The example is illustrated in FIG. 2, where the route field r at each step is enclosed in a numbered box. In the example, a message requiring a return message is sent from node 52 to node 55. The route field r appended to the original message is 0010 (box 70 in FIG. 2). The route field r is obtained from the lookup table or any other source of the route fields that is made available to node 52.

The message is received by router 50 at input port 2. Router 50 includes three ports. The number of ports equals $2^n+1$. Therefore, n=1 for router 50. Using the router equation, the output port b of router 50 is determined as follows:

$$b=(2+r[0:0]+1) \bmod (3),$$

or b=0.

Router 50 then reverses route field r bits 0 to n−1, and rotates route field r right n bits. Therefore, 0010 becomes 0001 (box 71 in FIG. 2). The message, with 0001 as its new route field r appended to it, is sent from router 50 on port 0.

The message, with route field r=0001 appended to it, is then received by router 51 at input port 0. Router 51 includes five ports. The number of ports equals $2^n+1$. Therefore, n=2 for router 51. Using the router equation, the output port b of router 51 is determined as follows:

$$b=(0+r[1:0]+1) \bmod (5),$$

or b=2.

Router 51 then reverses route field r bits 0 to n−1, and rotates route field r right n bits. Therefore, 0001 becomes 1000 (box 72 in FIG. 2). The message, with 1000 as its new route field r appended to it, is sent from router 51 on port 2 to node 55, the destination node.

When node 55 receives the message, it determines that a return message is required. The node 55 complements the route field r, and then bit reverses the route field r. Therefore, 1000 becomes 1110 (box 73 in FIG. 2). The return message, with 1110 as its new route field r appended to it, is sent from node 55 to router 51.

The return message, with route field r=1110 appended to it, is received by the router 51 at input port 2. Using the router equation, the output port b of router 51 is determined as follows:

$$b=(2+r[1:0]+1) \bmod (5),$$

or b=0.

Router 51 then reverses route field r bits 0 to n−1, and rotates route field r right n bits. Therefore, 1110 becomes 0111 (box 74 in FIG. 2). The return message, with 0111 as its new route field r appended to it, is sent from router 51 on port 0.

The return message, with route field r=0111 appended to it, is then received by router 50 at input port 0. Using the router equation, the output port b of router 50 is determined as follows:

$$b=(0+r[0:0]+1) \bmod (3),$$

or b=2.

Router 50 then reverses route field r bits 0 to n−1, and rotates route field r right n bits. Therefore, 0111 becomes 1011 (box 75 in FIG. 2). The return message, with 1011 as its new route field r appended to it, is sent from router 50 on port 2 to node 52, the source node.

As described, the communication network of the present invention enables both the route from a source node to a destination node, and the return route from the destination node to the source node, to be specified by using a small binary routing field. The header used in the present invention does not employ redundant information. The information contained in the header that specifies a route from a source mode to a destination node also specifies the return route from the destination node to the source node.

Several embodiments are specifically illustrated and/or described herein. However, it will be appreciated that modifications and variations of the present invention are covered by the above teachings and within the purview of the appended claims without departing from the spirit and intended scope of the invention. For example, the equations and steps described in conjunction with the flowcharts in FIGS. 3 and 4 may be modified as long as they enable a return route to be calculated from the source node to destination node route.

What is claimed is:

1. A source routing communication network of arbitrary topology for communicating a message that includes header information, wherein said communication network comprises:

(a) a plurality of routers, each router comprising a plurality of input/output ports and adapted to receive and send messages and to determine through which port of said router to send a router received message based on a portion of the header information; and (b) a plurality of nodes adapted to receive and send messages, each node coupled to one of said routers and adapted to modify the header information of a node received message so that the header information provides a return route to a source node of the node received message;

wherein said plurality of input/output ports are numbered consecutively in the clockwise direction starting with 0, and said each router comprises $2^n+1$ ports, wherein n>0 and is an integer; and wherein the header information comprises a binary route field "r", and the router received message that is input at input port "a" of said router is sent at output port "b" of said router, wherein b is calculated in accordance with the following equation:

$$b=(a+r[n-1:0]+1) \bmod (2^n+1).$$

2. The communication network of claim 1, wherein said router is adapted to reverse bits 0 to n−1 of said route field before the router received message is sent by said router.

3. The communication network of claim 2, wherein said router is adapted to right rotate said route field n bits before the router received message is sent by said router.

4. The communication network of claim 1, wherein the header information comprises a binary route field, and said each node complements said binary route field of the node received message.

5. The communication network of claim 4, wherein said node bit-reverses said binary route field of the node received message.

6. A method of communicating a message that includes header information in a source routing communication network of arbitrary topology, wherein said network comprises a plurality of routers and nodes, and wherein the routers comprise a plurality of input/output ports, said method comprising the steps of:

(a) sending the message from a source node, wherein the header information comprises a route to a destination node;

(b) receiving the message at the destination node;

(c) modifying the header information of the destination node received message so that the header information comprises a route to the source node;

(d) receiving the message at an input port of one of the plurality of routers:

(e) determining an output port of the one router to send the router received message; and (f) sending the router received message from the output port;

wherein said plurality of input/output ports are numbered consecutively in the clockwise direction starting with 0, and each of the plurality of routers comprises $2^n+1$ ports, wherein n>0 and is an integer; and wherein the header information comprises a binary route field "r", step (e) comprising the steps of:

(e-1) determining the input port "a" where the router received message is received; and (e-2) calculating the output port "b" where the router received message is sent in accordance with the following equation:

$$b=(a+r[n-1:0]+1) \bmod (2^n+1).$$

7. The method of claim 6, further comprising the step of:

(d) sending a reply message from the destination node, said reply message including the modified header information.

8. The method of claim 7, wherein the header information comprises a binary route field, step (c) comprising the step of:

(c-1) complementing the binary route field of the node received message.

9. The method of claim 8, step (c) further comprising the step of:

(c-2) bit-reversing the binary route field of the received message.

10. The method of claim 7, further comprising the step of:

(g) reversing bits 0 to n−1 of said route field before sending the router received message.

11. The method of claim 10, further comprising the step of:

(h) rotating said route field n bits right.

12. A source routing communication network of arbitrary topology for communicating a message that includes header information, wherein said communication network comprises:

(a) a plurality of routers adapted to receive and send messages, each router comprising:
 (I) a plurality of input/output ports; and
 (ii) first means for determining which output port of said router to send a router received message based on a portion of the header information; and (b) a plurality of nodes adapted to receive and send messages, each node coupled to one of said routers and comprising:
 (I) means for modifying the header information of a node received message so that the header information provides a return route to a source node of the node received message;

wherein said plurality of input/output ports are numbered consecutively in the clockwise direction starting with 0. and each router comprises $2^n+1$ ports wherein n>0 and is an integer; and wherein the header information comprises a binary route field "r" and said first means for determining comprises:

(a) second means for determining the input port "a" where the router received message is received; and (b) means for calculating the output port "b" where the router received message is sent in accordance with the following equation:

$$b=(a+r[n-1:01]+1) \bmod (2^n+1).$$

13. The communication network of claim 12, each of said plurality of routers further comprising:

means for reversing bits 0 to n−1 of the route field.

14. The communication network of claim 13, each of said plurality of routers further comprising:

means for rotating the route field n bits.

15. The communication network of claim 8, wherein the header information comprises a binary route field and said means for modifying comprises:

means for complementing said binary route field of the node received message.

16. The communication network of claim 15, said means for modifying further comprising:

means for bit-reversing said binary route field of the node received message.

* * * * *

UNITED STATES PATENT AND TRADEMARK OFFICE
CERTIFICATE OF CORRECTION

PATENT NO. : 5,928,332
DATED : July 27, 1999
INVENTOR(S) : Paul R. Pierce

It is certified that error appears in the above-identified patent and that said Letters Patent is hereby corrected as shown below:

Column 2, line 21    "$2_n$" should be --$2^n$--

Column 5, line 38    "mode" should be --node--

Signed and Sealed this

Tenth Day of October, 2000

Attest:

Attesting Officer

Q. TODD DICKINSON
Director of Patents and Trademarks